United States Patent
Zhang

(10) Patent No.: US 12,417,610 B2
(45) Date of Patent: Sep. 16, 2025

(54) STORAGE MEDIUM, TRACE DETECTION DEVICE, AND DEVICE AND METHOD FOR TRAINING TRACE DETECTION MODEL

(71) Applicant: BOE TECHNOLOGY GROUP CO., LTD., Beijing (CN)

(72) Inventor: Huanhuan Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 794 days.

(21) Appl. No.: 17/629,377

(22) PCT Filed: Mar. 10, 2021

(86) PCT No.: PCT/CN2021/079938
§ 371 (c)(1),
(2) Date: Jan. 22, 2022

(87) PCT Pub. No.: WO2021/218420
PCT Pub. Date: Nov. 4, 2021

(65) Prior Publication Data
US 2022/0262090 A1  Aug. 18, 2022

(30) Foreign Application Priority Data
Apr. 30, 2020  (CN) .......................... 202010362054.8

(51) Int. Cl.
*G06V 10/25* (2022.01)
*G06T 3/40* (2024.01)
(Continued)

(52) U.S. Cl.
CPC .............. *G06V 10/25* (2022.01); *G06T 3/40* (2013.01); *G06T 7/13* (2017.01); *G06T 7/136* (2017.01);
(Continued)

(58) Field of Classification Search
CPC ........ G06V 10/25; G06V 10/457; G06T 3/40; G06T 7/13; G06T 7/136;
(Continued)

(56) References Cited

U.S. PATENT DOCUMENTS 7,167,583 B1 * 1/2007 Lipson .................... G06T 7/194
382/256
10,628,546 B1  4/2020 Colwell et al.
(Continued)

FOREIGN PATENT DOCUMENTS

CN  1979499 A  6/2007
CN  108090897 A  5/2018
(Continued)

OTHER PUBLICATIONS

Kim, J.; Ko, J.; Choi, H.; Kim, H. Printed Circuit Board Defect Detection Using Deep Learning via a Skip-Connected Convolutional Autoencoder. Sensors 2021, 21, 4968. https://doi.org/10.3390/s21154968 (Year: 2021).*
(Continued)

*Primary Examiner* — Charles T Shedrick
(74) *Attorney, Agent, or Firm* — Perilla Knox & Hildebrandt LLP; Kenneth A. Knox

(57) ABSTRACT

A non-transitory computer-readable storage medium, a trace detection device, and a device and method for training a trace detection model are described, relating to the technical field of machine learning. The training method comprises obtaining a sample image and a sample tag of the sample image; performing line segment detection on the sample image, and obtaining a line segment edge feature of the sample image; generating a training feature according to the line segment edge feature; and training a classification model according to the sample tag and the training feature to obtain a trace detection model (S140).

15 Claims, 5 Drawing Sheets

(51) Int. Cl.
*G06T 7/13* (2017.01)
*G06T 7/136* (2017.01)
*G06V 10/44* (2022.01)

(52) U.S. Cl.
CPC .. *G06V 10/457* (2022.01); *G06T 2207/20081* (2013.01)

(58) Field of Classification Search
CPC . G06T 2207/20081; G06T 2207/20084; G06T 7/337; G06T 7/0004; G06T 7/11; G06F 18/2411; G06N 3/045; G06N 20/10; G06N 3/08
See application file for complete search history.

(56) References Cited

U.S. PATENT DOCUMENTS

| | | | | |
|---|---|---|---|---|
| 2011/0280496 | A1* | 11/2011 | Kojima | G06T 7/13 382/286 |
| 2019/0035104 | A1* | 1/2019 | Cuban | G08B 13/196 |
| 2021/0287352 | A1* | 9/2021 | Calderon | G06V 10/772 |
| 2023/0118709 | A1* | 4/2023 | Lee | G06T 7/136 439/489 |
| 2024/0211087 | A1* | 6/2024 | Zhang | G06F 3/045 |

FOREIGN PATENT DOCUMENTS

| | | |
|---|---|---|
| CN | 109409664 A | 3/2019 |
| CN | 110782439 A | 2/2020 |

OTHER PUBLICATIONS

A. Sayegh, M. Z. Mohd Jenu and S. Z. Sapuan, "Neural network based model for radiated emissions prediction from high speed PCB traces," 2014 International Conference on Computer, Communications, and Control Technology (I4CT), Langkawi, Malaysia, 2014, pp. 320-323, doi: 10.1109/I4CT.2014.6914197. (Year: 2014).*
International Search Report and Written Opinion for International Application No. PCT/CN2021/079938 mailed Jun. 9, 2021.
Lianjin Guo, Yuexin Xie and Bingjun Luo, "Surface Quality inspection of PCB based on subpix," Electronics Quality 375 06 (2018).

* cited by examiner

STORAGE MEDIUM, TRACE DETECTION DEVICE, AND DEVICE AND METHOD FOR TRAINING TRACE DETECTION MODEL

CROSS-REFERENCE TO RELATED APPLICATION

The present application is a national phase application under 35 U.S.C. § 371 of International Application No. PCT/CN2021/079938 filed Mar. 10, 2021, which claims the benefit of and priority to Chinese Patent Application No. 202010362054.8, entitled "STORAGE MEDIUM, TRACE DETECTION DEVICE, AND DEVICE AND METHOD FOR TRAINING TRACE DETECTION MODEL" filed on Apr. 30, 2020, the contents of both of which being incorporated by reference in their entireties herein.

TECHNICAL FIELD

The present disclosure relates to the field of machine learning technologies and, in particular to a non-transitory computer-readable storage medium, a trace detection device, and a device and method for training a trace detection model.

BACKGROUND

There are a large number of circuits in electronic products, and it is necessary to lay a large number of traces. In production processes, in order to improve product yields, it is necessary to check the traces. At present, manual inspection is generally used to determine whether the traces are standardized.

It should be noted that the information disclosed in the Background section above is only for enhancing the understanding of the background of the present disclosure, and thus may include information that does not constitute prior art known to those ordinary skilled in the art.

BRIEF SUMMARY

Embodiments of the present disclosure provide a readable storage medium, a trace detection device, and a device and method for training a trace detection model.

According to an aspect of the present disclosure, there is provided a training method for a trace detection model, including:
  acquiring a sample image and a sample tag of the sample image;
  performing line segment detection on the sample image, and acquiring a line segment edge feature of the sample image;
  generating a training feature according to the line segment edge feature; and
  obtaining a trace detection model by training a classification model according to the sample tag and the training feature.

In an exemplary embodiment of the present disclosure, the performing the line segment detection on the sample image and the acquiring the line segment edge feature of the sample image include:
  obtaining a target sample image by pre-processing the sample image;
  determining a region of interest (ROI) in the target sample image;
  obtaining a line segment detection result by performing the line segment detection on the ROI of the target sample image, wherein the line segment detection result includes endpoint coordinates of each detected line segment;
  generating a line segment detection image according to the line segment detection result; and
  acquiring, according to the line segment detection image, a line segment edge feature of an edge point as the line segment edge feature of the sample image, wherein the line segment edge feature of each edge point includes coordinates of the edge point and a slope of a line segment to which the edge point belongs.

In an exemplary embodiment of the present disclosure, the obtaining the target sample image by pre-processing the sample image includes:
  acquiring a standard image;
  performing registration on the sample image according to the standard image; and
  obtaining the target sample image by down-sampling the sample image subjected to the registration.

In an exemplary embodiment of the present disclosure, the determining the ROI in the target sample image includes:
  acquiring a ROI parameter, and the ROI parameter includes position information of the ROI; and
  determining the ROI in the target sample image according to the ROI parameter.

In an exemplary embodiment of the present disclosure, the generating the line segment detection image according to the line segment detection result includes:
  determining a length of each line segment detected in the target sample image according to the line segment detection result;
  screening out a line segment whose length is within a length threshold range as a reference line segment, and using endpoint coordinates of the reference line segment as reference endpoint coordinates; and
  generating the line segment detection image according to the reference endpoint coordinates of the reference line segment.

In an exemplary embodiment of the present disclosure, the generating the line segment detection image according to the reference endpoint coordinates of the reference line segment includes:
  obtaining one or more target line segments by generating, according to the reference endpoint coordinates of the reference line segment, a line connecting two endpoints of each reference line segment; and
  obtaining the line segment detection image comprising the one or more target line segments by setting pixel values for each target line segment, wherein the pixel values of the same target line segment are same, wherein in response to that the line segment detection image comprises multiple target line segments, different target line segments have different pixel values.

In an exemplary embodiment of the present disclosure, the acquiring, according to the line segment detection image, the line segment edge feature of the edge point as the line segment edge feature of the sample image includes:
  determining a total number of edge points of the target line segment in the line segment detection image, and acquiring a line segment edge feature of each edge point of the target line segment, wherein the line segment edge feature of each edge point includes coordinates of the edge point and a slope of a target line segment to which the edge point belongs;
  comparing the total number of edge points of the target line segment in the line segment detection image with a number threshold;

if the total number of edge points of the target line segment in the line segment detection image is not greater than the number threshold, using the line segment edge feature of each edge point as the line segment edge feature of the sample image; and if the total number of edge points of the target line segment in the line segment detection image is greater than the number threshold, down-sampling the line segment detection image at a preset sampling ratio, and using a line segment edge feature of an edge point of a target line segment in the down-sampled line segment detection image as the line segment edge feature of the sample image, wherein the sampling ratio is a ratio of the number threshold to the number of edge points of the line segment detection image before the down-sampling.

In an exemplary embodiment of the present disclosure, the down-sampling the line segment detection image at the preset sampling ratio includes:

acquiring coordinates of a pixel point of the target line segment in the line segment detection image and a slope of the target line segment to which the pixel point belongs;

determining floating-point type coordinates of the pixel point of the target line segment and a floating-point type slope of the target line segment according to the preset sampling ratio, the coordinates of the pixel point of the target line segment, and the slope of the target line segment, wherein the sampling ratio is a ratio of the number threshold to the total number of edge points of the line segment detection image before the down-sampling; and determining a line segment edge feature of the edge point of the target line segment in the down-sampled line segment detection image according to the floating-point type coordinates and the floating-point type slope of the target line segment.

In an exemplary embodiment of the present disclosure, the generating the training feature according to the line segment edge feature includes:

obtaining the training feature by the line segment edge feature.

In an exemplary embodiment of the present disclosure, the classification model is a support vector machine model or a convolutional neural network model.

According to an aspect of the present disclosure, there is provided a training device for a trace detection model, including:

an acquisition unit configured to acquire a sample image and a sample tag of the sample image;

a detection unit configured to perform line segment detection on the sample image, and acquire a line segment edge feature of the sample image;

a processing unit configured to generate a training feature according to the line segment edge feature; and a generation unit configured to obtain a trace detection model by training a classification model according to the sample tag and the training feature.

According to an aspect of the present disclosure, there is provided a trace detection method, including:

performing any of the above-mentioned training methods to generate a trace detection model;

acquiring an image to be detected;

performing the line segment detection on the image to be detected, and acquiring a line segment edge feature of the image to be detected; and obtaining a detection result by inputting the line segment edge feature into the trace detection model, and determining whether the image to be detected is standardized according to the detection result.

In an exemplary embodiment of the present disclosure, the performing the line segment detection on the image to be detected includes:

obtaining a target image to be detected by pre-processing the image to be detected;

determining a region of interest in the target image to be detected;

obtaining a line segment detection result of the image to be detected by performing the line segment detection on the region of interest of the target image to be detected, wherein the line segment detection result includes endpoint coordinates of each detected line segment;

generating a line segment detection image according to each line segment detection result; and acquiring, according to the line segment detection image, a line segment edge feature of an edge point as the line segment edge feature of the image to be detected, wherein the line segment edge feature of each edge point includes coordinates of the edge point and a slope of a line segment to which the edge point belongs.

According to an aspect of the present disclosure, there is provided a trace detection device, including:

an image capturing device, configured to: capture an image to be detected;

a memory, configured to store executable instructions; and a processor, coupled to the image capturing device and the memory, wherein the processor is configured to acquire the image to be detected and the executable instructions, and execute any one of the foregoing trace detection methods by executing the executable instructions.

According to an aspect of the present disclosure, there is provided a non-transitory readable storage medium having a computer program stored thereon, wherein the computer program, when executed, implements any one of the foregoing training methods, or the computer program, when executed, implements any one of the foregoing trace detection methods.

It should be noted that the above general description and the following detailed description are merely exemplary and explanatory and should not be construed as limiting of the disclosure.

BRIEF DESCRIPTION OF THE DRAWINGS

The drawings here are incorporated into the specification and constitute a part of the specification, show embodiments in accordance with the present disclosure, and are used together with the specification to explain the principle of the present disclosure. Apparently, the drawings in the following description are only some embodiments of the present disclosure. For those ordinary skilled in the art, other drawings can be obtained based on these drawings without creative work.

DETAILED DESCRIPTION

Figure 1:
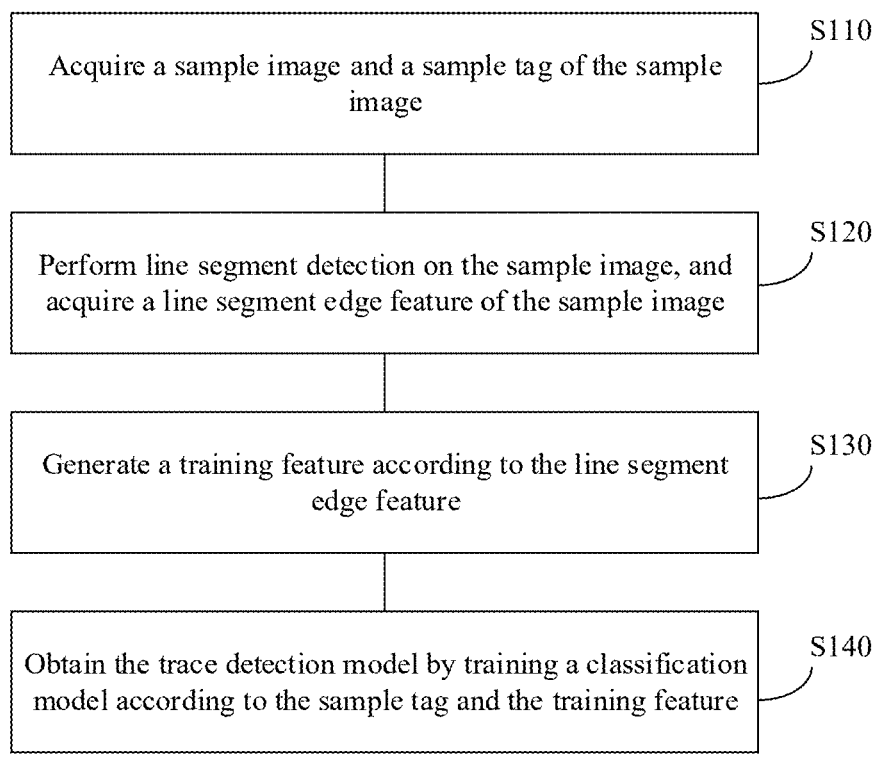
FIG. 1 is a flowchart of an embodiment of a training method of the present disclosure.

Exemplary embodiments will now be described more fully with reference to the accompanying drawings. However, the exemplary embodiments can be implemented in a variety of forms and should not be construed as being limited to the examples set forth herein; rather, these embodiments are provided so that the present disclosure will be more full and complete so as to convey the idea of the exemplary embodiments to those skilled in this art. The described features, structures, or characteristics may be combined in any suitable manner in one or more embodiments. In the following description, many specific details are provided to give a full understanding of the embodiments of the present disclosure. However, those skilled in the art will appreciate that the technical solution of the present disclosure may be practiced without one or more of the specific details, or other methods, components, devices, steps, and the like may be employed. In other instances, well-known structures, materials, or operations are not shown or described in detail to avoid obscuring various aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

The terms "one", "a", "the", and "said" are used to indicate that there are one or more elements/components or the like; the terms "include" and "have" are used to indicate an open meaning of including and means that there may be additional elements/components/etc. in addition to the listed elements/components/etc.; the terms "first", and "second" etc. are used only as markers, and do not limit the number of objects.

Embodiments of the present disclosure provide a training method for a trace detection model. As shown in FIG. 1, the training method may include step S110 to step S140.

In step S110, a sample image and a sample tag of the sample image are acquired.

In step S120, line segment detection is performed on the sample image, and a line segment edge feature of the sample image is acquired.

In step S130, a training feature is generated according to the line segment edge feature.

In step S140, a trace detection model is obtained by training a classification model according to the sample tag and the training feature.

Through the training method of the present disclosure, the line segment edge feature of the sample image can be acquired, by means of the line segment detection, to reflect a pattern of the traces, and the trace detection model is obtained by training based on the sample image and the sample tag. The trace detection model can be used to classify traces of an image to be detected, so as to check whether the traces are standardized by means of machine learning, avoiding manual inspections. Accordingly, work efficiency can be improved, and labor costs are saved. In addition, it can also avoid missed and wrong inspections caused by operator errors and other reasons, which is conducive to improving accuracy of inspection results.

The training method according to the embodiment of the present disclosure is described in detail below.

In step S110, the sample image and the sample tag of the sample image are acquired.

The sample image may be an image of an electronic device to be detected, and contains a pattern of traces. The electronic device may be a circuit board or other devices arranged with the traces, which is not specifically limited here. The sample tag includes at least a standard sample tag and a non-standard sample tag.

In some embodiments of the present disclosure, multiple ample images are acquired, and each sample image corresponds to one sample tag, that is, it is determined that whether the traces reflected by each sample image are standardized.

It should be noted that the multiple sample images can be for the same trace region of the same electronic device to ensure the unity of an evaluated object. In some embodiments, for different electronic devices or different trace regions of the same electronic device, there may be common problems that belong to the non-standard. In this case, the multiple sample images can also be for different electronic devices or different regions of the same electronic device, but a criterion for determining whether it is standard or non-standard is the same.

In step S120, the line segment detection is performed on the sample image, and the line segment edge feature of the sample image is acquired.

The trace can be identified by means of the line segment detection, and the trace can be characterized by the line segment edge feature, so as to generate the training feature subsequently.

Figure 2:
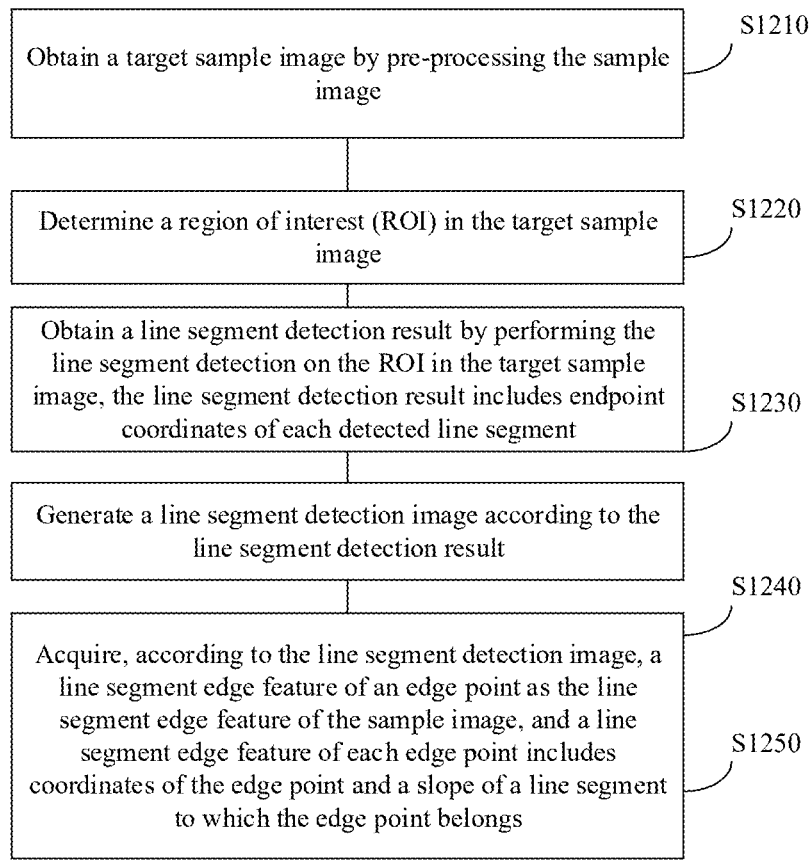
FIG. 2 is a flowchart of step S120 of an embodiment of a training method of the present disclosure.

As shown in FIG. 2, in some embodiments of the present disclosure, a processing procedure of one sample image is taken as an example: the step, in which the line segment detection is performed on the sample image and the line segment edge feature of the sample image is acquired, that is, step S120, may include steps S1210 to S1250.

In step S1210, a target sample image is obtained by pre-processing the sample image.

The pre-processing may include performing operations such as correction and size transformation on the sample image, so as to perform the line segment detection.

Figure 3:
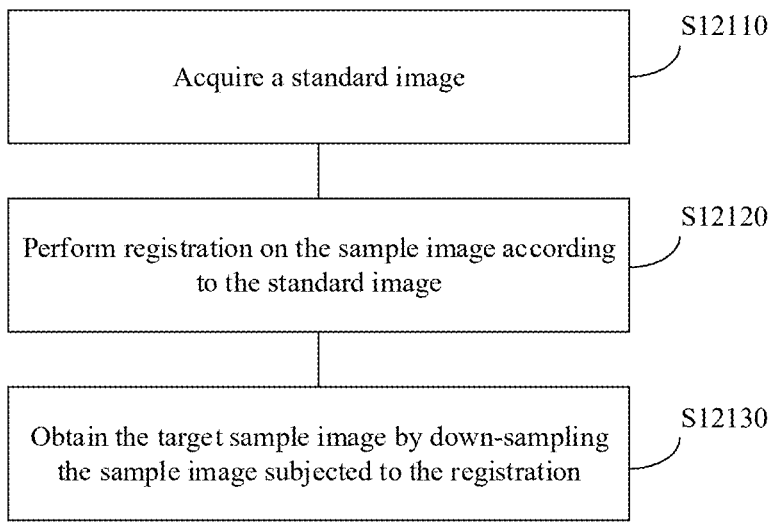
FIG. 3 is a flowchart of step S1210 of an embodiment of a training method of the present disclosure.

As shown in FIG. 3, in some embodiments of the present disclosure, the step, in which the target sample image is obtained by pre-processing the sample image, that is, step S1210, may include steps S12110 to S12130.

In step S12110, a standard image is acquired.

The standard image and the sample image are images corresponding to the same trace area. The standard image can be set or collected in advance, and meets conditions for performing line segment collection. The standard image can be acquired at the same time as the aforementioned sample image and sample tag, that is, step S12110 and step S110 can be performed simultaneously.

In step S12120, registration is performed on the sample image according to the standard image.

A scale-invariant feature transform (SIFT) algorithm can be used for registration. Alternatively, a deep learning registration method based on a RegNet network model or other network models can be used to achieve the registration. The registration method is not specifically limited herein.

In step S12130, the sample image subjected to the registration is down-sampled to obtain the target sample image.

To reduce an amount of processing required to be performed by a hardware processor, for example, the target sample image with smaller data volume can be obtained by down-sampling. A down-sampling ratio can be 1/4, but it is not limited to this, and it can also be 1/2 or other ratios. The down-sampling of the sample image can be achieved by using a resize function based on an open source computer vision library (OpenCV). In addition, other methods can also be used. The specific method of down-sampling to form the target sample image is not specifically limited here.

In step S1220, a region of interest (ROI) in the target sample image is determined.

The ROI can be determined based on position information acquired in advance, for example:

in some embodiments of the present disclosure, the step, in which the ROI in the target sample image is determined, that is, step S1220, may include step S12210 and step S12220.

In step S12210, a ROI parameter is acquired, and the ROI parameter includes position information of the ROI.

The ROI parameter may include coordinates of a reference point of the ROI and a height and a width of the ROI. Taking the ROI as a rectangle as an example, the reference point can be a vertex of the ROI. In addition, the reference point can also be a center of the ROI or another point, as long as the ROI can be determined in the target sample image.

In addition, the ROI parameter can be acquired simultaneously with the aforementioned training sample and sample tag, that is, step S12210 can be performed simultaneously with step S110.

In step S12220, the ROI in the target sample image is determined according to the ROI parameter.

Based on the ROI parameter acquired in step S12210, the ROI can be screened out from the target sample image. For example, based on OpenCV, the ROI is screened out from the target sample image based on the ROI parameter.

In step S1230, the line segment detection result is obtained by performing the line segment detection on the ROI of the target sample image, and the line segment detection result includes endpoint coordinates of each detected line segment.

The endpoint coordinates include an abscissa and an ordinate in a reference coordinate system. The line segment detection may be performed on the ROI of the target sample image through an OpenCV LSD line segment detection algorithm, and the endpoint coordinates of each line segment in the ROI can be detected to obtain the line segment detection result containing coordinates of each endpoint. In addition, a Hough transform method or other methods can also be used to realize the line segment detection, as long as the endpoint coordinates of each line segment can be acquired.

In step S1240, the line segment detection image is generated according to the line segment detection result.

A target line segment can be generated according to the endpoint coordinates of each line segment in the line segment detection result, and the line segment detection image containing one or more target line segments can be obtained.

In some embodiments of the present disclosure, the step, in which the line segment detection image is generated according to the line segment detection result, that is, step S1240, may include steps S12410 to S12430.

In step S12410, a length of each line segment detected in the target sample image is determined according to the line segment detection result.

The length of a corresponding line segment can be determined according to coordinates of each endpoint in the line segment detection result, that is, a distance between two endpoints belonging to the same line segment, and the distance can be characterized by the number of pixels. For example, for two endpoint coordinates belonging to the same line segment, both endpoint coordinates include abscissas and ordinates in the reference coordinate system.

In step S12420, a line segment whose length is within a length threshold range is screened out as a reference line segment, and endpoint coordinates of the reference line segment are used as reference endpoint coordinates.

The length threshold range has an upper limit and a lower limit. The length of each line segment can be compared with the upper limit and the lower limit of the length threshold range, and the endpoint coordinates of the line segment whose length is not less than the lower limit and not greater than the upper limit are screened out as the reference endpoint coordinates, that is, the endpoint coordinates of the line segment whose length is within the length threshold range are screened out as the reference endpoint coordinates, so as to remove line segments that are too short and too large in length. A size of the length threshold range can be preset according to a resolution of the target sample image and an actual size of the trace, which is not specifically limited here, and the purpose is to remove line segments that art not the traces, that is, to remove noise. For example, in some embodiments of the present disclosure, the length threshold range may be 30-100.

In step S12430, the line segment detection image is generated according to the reference endpoint coordinates of the reference line segment.

In some embodiments of the present disclosure, the step, in which the line segment detection image is generated according to the reference endpoint coordinates of the reference line segment, that is, step S12430, may include step S124310 and step S124320.

In step S124310, a line connecting two endpoints of each reference line segment is generated according to the reference endpoint coordinates of the reference line segment to obtain one or more target line segments.

For each selected reference line segment, the line connecting the two endpoints is generated to obtain the target line segment, that is, each target line segment includes two reference endpoints and the line between the reference endpoints. The reference line segment and the target line segment may completely overlap, or may only overlap partially. If the number of reference line segments is multiple, individual reference line segments can be selected in sequence according to a preset order, and multiple target line segments corresponding to individual reference line segments are generated.

For example, each reference line segment can be numbered, and different reference line segments have different numbers, so that the reference line segments can be sorted according to a magnitude of the number, so as to determine an order of selecting the reference line segments. The number can be a positive integer, such as 1, 2, 3, etc. The line between the two reference endpoints can be generated based on a line function of OpenCV. In addition, other functions or algorithms can also be used to generate the target line segment.

In step S124320, pixel values are set for each of the target line segments to obtain the line segment detection image including multiple target line segments, where the same target line segment has the same pixel value. If there is multiple target line segments, different target line segments have different pixel values.

For multiple target line segments, in order to distinguish individual target line segments, different pixel values can be assigned to different target line segments, and the pixel values can be gray levels. For example, for any target line segment, the number of the reference line segment corresponding to the endpoint of the target line segment can be used as the pixel value of the target line segment, so that the gray level of each pixel point of the target line segment is equal to the number.

In step S1250, a line segment edge feature of an edge point is acquired, according to the line segment detection image, as the line segment edge feature of the sample image, and the line segment edge feature of each edge point includes coordinates of the edge point and a slope of a line segment to which the edge point belongs.

Figure 4:
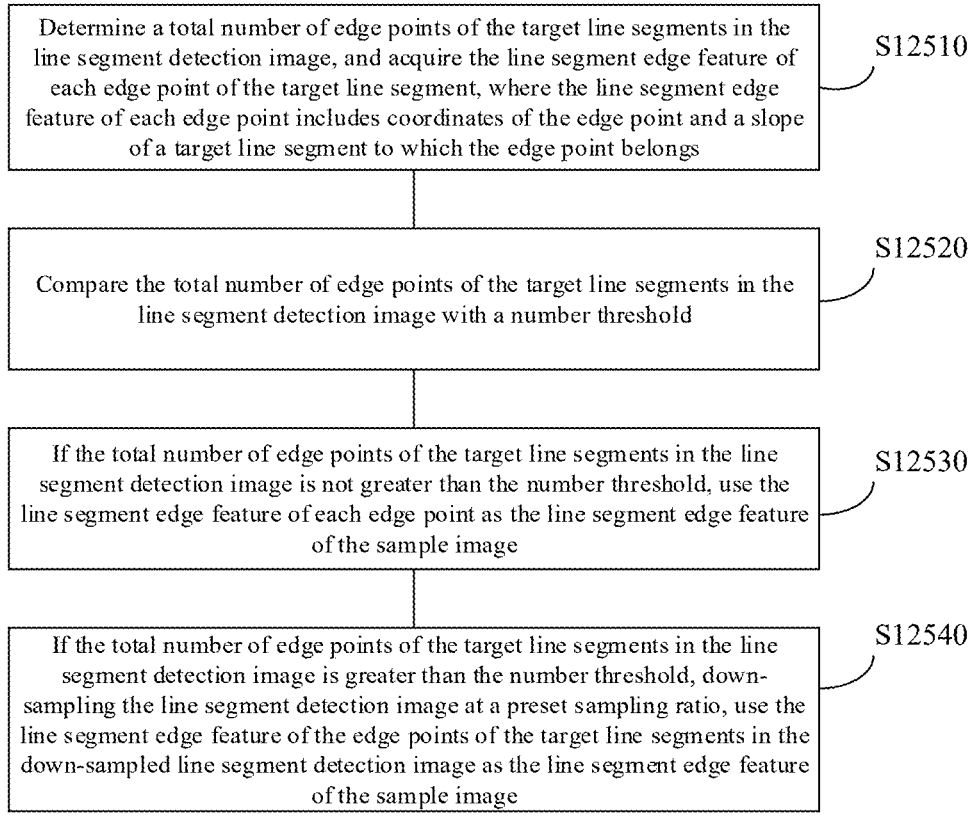
FIG. 4 is a flowchart of step S1250 of an embodiment of a training method of the present disclosure.

As shown in FIG. 4, in some embodiments of the present disclosure, the step, in which the line segment edge feature of the edge point is acquired, according to the line segment detection image, as the line segment edge feature of the sample image, that is, step S1250, may include steps S12510 to S12540.

In step S12510, a total number of edge points of the target line segments in the line segment detection image is determined, and a line segment edge feature of each edge point of the target line segment is acquired, the line segment edge feature of each edge point includes coordinates of the edge point and a slope of a target line segment to which the edge point belongs.

The slope of the line segment to which the edge point belongs refers to a slope of a target line segment to which the edge point belongs. In each target line segment, the line segment edge feature of each edge point includes the coordinates of the edge point and the slope of the target line segment to which it belongs. The coordinates of each edge point include an abscissa and an ordinate of the edge point in the reference coordinate system. The slope of the target line segment can be characterized by an angle between the target line segment and an abscissa axis.

In step S12520, the total number of edge points of the target line segments in the line segment detection image is compared with a number threshold.

In order to limit the number of edge points and reduce the amount of calculation, the total number of edge points of all target line segments can be compared with the number threshold. A magnitude of the number threshold is not specifically limited here. For example, the number threshold can be 1,000.

In step S12530, if the total number of edge points of the target line segments in the line segment detection image is not greater than the number threshold, the line segment edge feature of each edge point is used as the line segment edge feature of the sample image.

If the number of edge points is less than or equal to the number threshold, the line segment edge feature of each edge point can be directly used as the training feature to train the classification model.

In step S12540, if the total number of edge points of the target line segments in the line segment detection image is greater than the number threshold, the line segment detection image is down-sampled at a preset sampling ratio, and the line segment edge feature of the edge point of the target line segments in the down-sampled line segment detection image is used as the line segment edge feature of the sample image, and the sampling ratio is a ratio of the number threshold to the total number of edge points of the line segment detection image before the down-sampling.

If the number of edge points is greater than the number threshold, it indicates that the number of edge points is too large. Therefore, the line segment detection image can be down-sampled to reduce the number of edge points. The sampling ratio adopts the ratio of the number threshold to the total number of edge points of the line segment detection image before the down-sampling, which can ensure that the number of edge points after the down-sampling is less than or equal to the number threshold.

In some embodiments of the present disclosure, the step, in which the line segment detection image is the down-sampling at the preset sampling ratio, that is, step S12540, may include steps S125410 to S125430.

In step S125410, coordinates of a pixel point of the target line segment in the line segment detection image and a slope of the target line segment to which the pixel point belongs are acquired.

In step S125420, according to the preset sampling ratio, the coordinates of a pixel point of the target line segment, and the slope of the target line segment, floating-point type coordinates of the pixel point of the target line segment and a floating-point type slope of the target line segment are determined, and the sampling ratio is a ratio of the number threshold to the total number of edge points of the line segment detection image before the down-sampling.

In step S125430, a line segment edge feature of the edge point of the target line segment in the down-sampled line segment detection image is determined according to the floating-point type coordinates and the floating-point type slope of the target line segment.

Further, for example:

Three two-dimensional arrays with the same width and height as the line segment detection image are created, that is, arr_sum_x, arr_count_x; arr_sum_y, arr_count_y; arr_sum_a, and arr_count_a. A data type of each two-dimensional array is the floating-point type, and is initialized to 0.

An abscissa j, ordinate i of each pixel point of the line segment detection image and the slope of the target line segment to which each pixel point belongs are traversed and acquired in a preset order. The slope can be characterized by an angle a between the pixel point and the abscissa axis.

The floating-point type coordinates of the down-sampled pixel point are calculated according to the sampling ratio, where the floating-point type coordinate x_float=j×ratio, the floating-point type coordinate y_float=i×ratio, ratio is the sampling ratio, ratio=threshold/n, n>threshold, threshold is the number threshold, and n is the number of edge points of the line segment detection image before the down-sampling, 1>ratio>0. The floating-point type coordinates can be rounded to obtain: x_int=int(x_float+0.5), y_int=int(y_float+0.5). x_float is added to a value of the corresponding position of arr_sum_x, y_float is added to a value of the corresponding position of arr_sum_y, a is added to a value of the corresponding position of arr_sum_a, and 1 is added to values of the corresponding positions of arr_count_x, arr_count_y, and arr_count_a, respectively.

The abscissa j and the ordinate i of the pixel point of the reference image are traversed and acquired. If arr_count[i][j] is greater than 0, the floating-point type coordinates of the edge point of the reference image can be calculated to obtain the line segment edge feature of the edge point:

$$x2\_float = arr\_sum\_x[i][j]/arr\_count[i][j];$$

$$y2\_float = arr\_sum\_y[i][j]/arr\_count[i][j];$$

$$a2\_float = arr\_sum\_a[i][j]/arr\_count[i][j].$$

x2_float is a floating-point type abscissa of the pixel point, y2_float is a floating-point type ordinate of the pixel point, and a2_float is the slope of the pixel point with respect to the floating-point type.

In step S130, the training feature is generated according to the edge feature of the line segment.

The training feature may be obtained by normalizing the line segment edge feature of the edge point. For example, an abscissa of the edge point can be divided by a width of the line segment detection image, an ordinate can be divided by a height of the line segment detection image, and a slope of a target line segment to which the edge point belongs is characterized by an angle between the target line segment to which the edge point belongs and the abscissa axis. If the angle is in radians, the angle can be divided by π, and π equals to 3.1416.

In step S140, the trace detection model is obtained by training the preset classification model according to the sample tag and the training feature.

The classification model can adopt a support vector machine (SVM) model. Alternatively, deep learning point cloud classification technologies can also be used, and a PointNet network model with a classification function or other convolutional neural network models can be used as the classification model. The training feature is used as point cloud data for training. The trace detection model can be used to determine whether the trace is standardized or not, and output a result of standard or non-standard. For example, different numbers (such as 1 and 0) can be output to indicate standard and non-standard.

In some embodiments of the present disclosure, if the number of sample images is multiple, the above steps S120 to S130 can be performed on each sample image to obtain the training feature of each sample image, that is, multiple training features are obtained, and the specific details will not be repeated here. In this case, the number of sample tags is also multiple, and the sample tags and the sample images are in one-to-one correspondence. Correspondingly, the classification model can be trained according to the training feature and the sample tag of each sample image to obtain the trace detection model.

Figure 5:
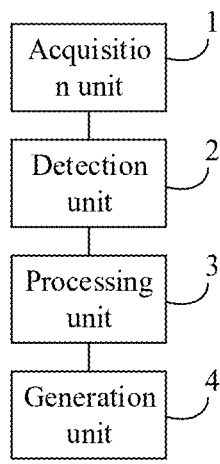
FIG. 5 is a block diagram illustrating an embodiment of a training device of the present disclosure.

The embodiments of the present disclosure provide a training device for a trace detection model. As shown in FIG. 5, the training device may include an acquisition unit 1, a detection unit 2, a processing unit 3, and a generation unit 4.

The acquisition unit 1 is configured to acquire a sample image and a sample tag of the sample image.

The detection unit 2 is configured to perform line segment detection on the sample image, and acquire a line segment edge feature of the sample image.

The processing unit 3 is configured to generate a training feature according to the line segment edge feature.

The generation unit 4 is configured to obtain a trace detection model by training a classification model according to the sample tag and the training feature.

The details and beneficial effects of each part of the training device of the embodiments of the present disclosure have been described in detail in the above embodiments of the training method, and will not be described in detail here.

Figure 6:
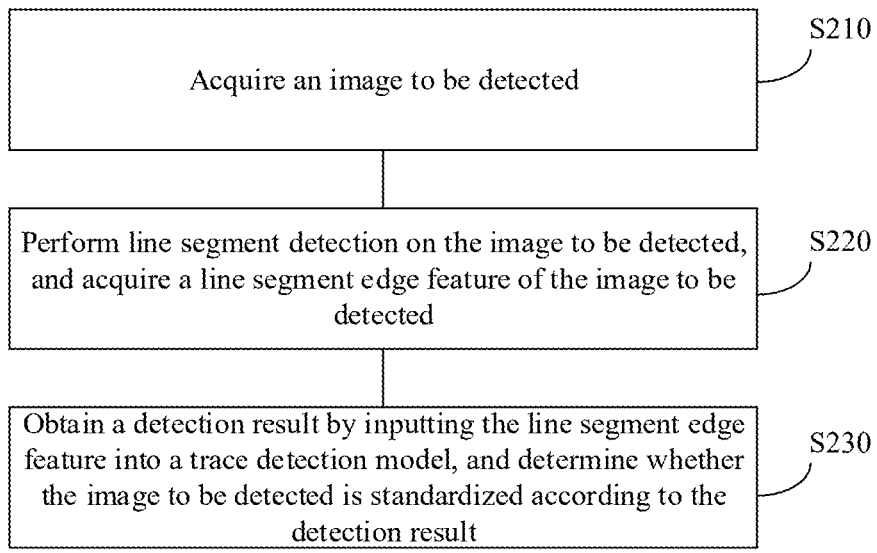
FIG. 6 is a flowchart of an embodiment of a trace detection method of the present disclosure.

The embodiments of the present disclosure also provide a trace detection method. As shown in FIG. 6, the trace detection method includes steps S210 to S230.

In step S210, an image to be detected is acquired.

In step S220, line segment detection is performed on the image to be detected, and a line segment edge feature of the image to be detected is acquired.

In step S230, a detection result is obtained by inputting the line segment edge feature into the trace detection model, and it is determined whether the image to be detected is standardized according to the detection result.

The following is a detailed description of the trace detection method of the present disclosure.

In step S210, the image to be detected is acquired.

The image to be detected can be an image of a trace area of an electronic device, and can be captured by shooting with a photographing device such as an industrial camera.

In step S220, the line segment detection is performed on the image to be detected, and the line segment edge feature of the image to be detected is acquired.

Figure 7:
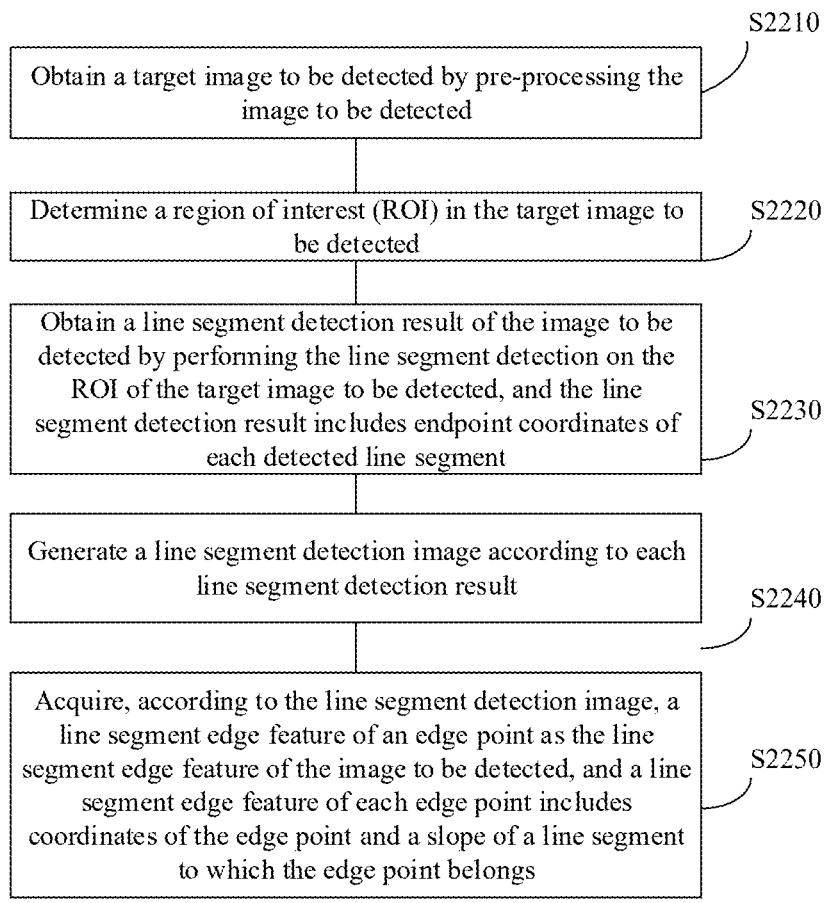
FIG. 7 is a flowchart of step S230 of an embodiment of a trace detection method of the present disclosure.

As shown in FIG. 7, in some embodiments of the present disclosure, the step in which the line segment detection is performed on the image to be detected, that is, step S220, may include steps S2210 to S2250.

In step S2210, a target image to be detected is obtained by pre-processing the image to be detected.

In step S2220, a region of interest in the target image to be detected is determined.

In step S2230, the line segment detection is performed on the region of interest of the target image to be detected to obtain a line segment detection result of the image to be detected, and the line segment detection result includes endpoint coordinates of each detected line segment.

In step S2240, a line segment detection image is generated according to each line segment detection result.

In step S2250, according to the line segment detection image, a line segment edge feature of an edge point is acquired as the line segment edge feature of the image to be detected, and the line segment edge feature of each edge point includes coordinates of the edge point and a slope of a line segment to which the edge point belongs.

A method for performing the line segment detection on the image to be detected can be the same as the method for performing the line segment detection on the sample image, as long as the sample image is replaced with the image to be detected. Accordingly, the specific details can refer to the above implementations of the line segment detection on the sample image, and will not be repeated here.

In step S230, a detection result is obtained by inputting the line segment edge feature into the trace detection model, and it is determined whether the image to be detected is standardized according to the detection result.

The trace detection model in this embodiment can adopt the trace detection model generated through the training method of the trace detection model in any of the above implementations, and the specific details can refer to the above implementations of the training method, and will not be repeated here.

The trace detection model can be used to determine whether the trace is standardized or not, and output a result indicating standard or non-standard. For example, different numbers (such as 1 and 0) can be output to indicate standard and non-standard.

It should be noted that although the various steps of the method in the present disclosure are described in a specific order in the drawings, this does not require or imply that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution, etc.

Figure 8:
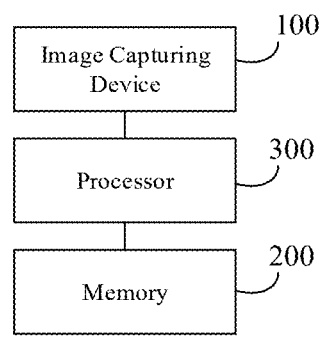
FIG. 8 is a block diagram illustrating an embodiment of a trace detection device of the present disclosure.

The embodiments of the present disclosure provide a trace detection device. As shown in FIG. 8, the trace detection device may include an image capturing device 100, a memory 200, and a processor 300.

The image capturing device 100 is configured to capture an image to be detected.

The memory 200 is configured to store executable instructions.

The processor 300 is coupled to the image capturing device 100 and the memory 200, and the processor 300 is configured to acquire the image to be detected from the image capturing device 100 and acquire the executable instructions from the memory 200; and the processor 300 is configured to execute the trace detection method of any of the foregoing embodiments by executing the executable instructions so as to output a result of whether the trace is standardized.

The details and beneficial effects of each part of the trace detection device in the embodiments of the present disclosure have been described in detail in the above implementations of the trace detection method, and will not be described in detail here.

It should be noted that although several apparatuses of the device for action execution are mentioned in the above detailed description, such division is not mandatory. In fact, features and functions of two or more apparatuses, modules, units, or circuits described above may be embodied in one apparatus, module, unit, or circuit in accordance with the embodiments of the present disclosure. Conversely, the features and functions of one apparatus, module, unit, or circuit described above may be further divided into multiple apparatuses, modules, units, or circuits to be embodied.

The embodiments of the present disclosure also provide a non-transitory readable storage medium having a computer program stored thereon, and the computer program, when executed, implements the training method for the trace detection model in any one of the foregoing embodiments, or implements the trace detection method in any one of the foregoing embodiments. In some embodiments, various aspects of the present disclosure can also be implemented in the form of a program product, which includes a program code, and when the program product runs on a terminal device, the program code is used to cause the terminal device to perform steps according to various exemplary embodiments of the present disclosure described in the above-mentioned training method of this specification.

Figure 9:
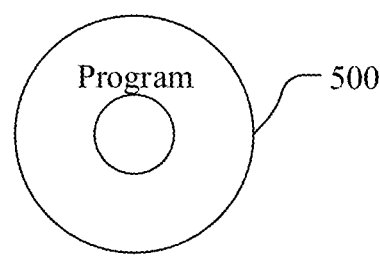
FIG. 9 is a schematic diagram of an embodiment of a readable storage medium of the present disclosure.

As shown in FIG. 9, a program product for implementing the above-mentioned training method according to an embodiment of the present disclosure is described. It can adopt can use a portable compact disc read-only memory (CD-ROM) and include the program code, which may run on a terminal device, for example, personal computer. However, the program product of the present disclosure is not limited thereto. In this document, the non-transitory readable storage medium 500 may be tangible medium containing or storing the program, and the program may be used by or in combination with an instruction execution system, apparatus, or device.

The program product may employ any combination of one or more readable media. The readable medium may be a non-transitory readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained in the readable medium may be transmitted using any appropriate medium, including but not limited to wireless, wired, optical cable, RF, etc., or any suitable combination of the foregoing.

The program code for performing the operations of the present disclosure may be written in any combination of one or more programming languages, which include object-oriented programming languages, such as Java, C++, etc. and further include conventional procedural programming language, such as 'C' or a similar programming language. The program code may be executed entirely or partly in the user computing device, may be executed as an independent software package, may be executed partly in the user computing device and partly in the remote computing device, or may be executed entirely in the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a mobile terminal, or a network device, etc.) to perform the methods according to embodiments in the present disclosure.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the appended claims.

What is claimed is:

1. A computer-implemented training method for a trace detection model, comprising:
acquiring a sample image and a sample tag of the sample image;
performing line segment detection on the sample image and acquiring a line segment edge feature of the sample image by:
obtaining a target sample image by pre-processing the sample image;
determining a region of interest (ROI) in the target sample image;
obtaining a line segment detection result by performing the line segment detection on the ROI in the target sample image, wherein the line segment detection result comprises endpoint coordinates of each detected line segment;
generating a line segment detection image according to the line segment detection result; and
acquiring, according to the line segment detection image, a line segment edge feature of an edge point as the line segment edge feature of the sample image, wherein a line segment edge feature of each edge point comprises coordinates of the edge point and a slope of a line segment to which the edge point belongs;
generating a training feature according to the line segment edge feature; and
obtaining the trace detection model by training a classification model according to the sample tag and the training feature;
wherein the generating the line segment detection image according to the line segment detection result comprises:
determining a length of each line segment detected in the target sample image according to the line segment detection result;
screening out a line segment whose length is within a length threshold range as a reference line segment, and using endpoint coordinates of the reference line segment as reference endpoint coordinates; and
generating the line segment detection image according to the reference endpoint coordinates of the reference line segment.

2. The training method according to claim 1, wherein the obtaining the target sample image by pre-processing the sample image comprises:
acquiring a standard image;
performing registration on the sample image according to the standard image; and
obtaining the target sample image by down-sampling the sample image subjected to the registration.

3. The training method according to claim 1, wherein the determining the ROI in the target sample image comprises:
acquiring a ROI parameter, wherein the ROI parameter comprises position information of the ROI; and
determining the ROI in the target sample image according to the ROI parameter.

4. The training method according to claim 1, wherein the generating the line segment detection image according to the reference endpoint coordinates of the reference line segment comprises:
obtaining one or more target line segments by generating, according to the reference endpoint coordinates of the reference line segment, a line connecting two endpoints of each reference line segment; and
obtaining the line segment detection image comprising one or more target line segments by setting pixel values for each target line segment, wherein the pixel values of the same target line segment are same, wherein in response to that the line segment detection image comprises multiple target line segments, different target line segments have different pixel values.

5. The training method according to claim 4, wherein the acquiring, according to the line segment detection image, the line segment edge feature of the edge point as the line segment edge feature of the sample image comprises:
determining a total number of edge points of the target line segments in the line segment detection image, and acquiring the line segment edge feature of each edge point of the target line segment, wherein the line segment edge feature of each edge point comprises coordinates of the edge point and a slope of a target line segment to which the edge point belongs;
comparing the total number of edge points of the target line segments in the line segment detection image with a number threshold;
if the total number of edge points of the target line segments in the line segment detection image is not greater than the number threshold, using the line segment edge feature of each edge point as the line segment edge feature of the sample image; and
if the total number of edge points of the target line segments in the line segment detection image is greater than the number threshold, down-sampling the line segment detection image at a preset sampling ratio, using the line segment edge feature of the edge points of the target line segments in the down-sampled line segment detection image as the line segment edge feature of the sample image, wherein the sampling ratio is a ratio of the number threshold to the number of edge points of the line segment detection image before the down-sampling.

6. The training method according to claim 5, wherein the down-sampling the line segment detection image at the preset sampling ratio comprises:
acquiring coordinates of a pixel point of the target line segment in the line segment detection image and a slope of the target line segment to which the pixel point belongs;
determining floating-point type coordinates of the pixel point of the target line segment and a floating-point type slope of the target line segment according to the preset sampling ratio, the coordinates of the pixel point of the target line segment, and the slope of the target line segment, wherein the sampling ratio is the ratio of the number threshold to the total number of edge points of the line segment detection image before the down-sampling; and
determining a line segment edge feature of an edge point of a target line segment in the down-sampled line segment detection image according to the floating-point type coordinates and the floating-point type slope of the target line segment.

7. The training method according to claim 1, wherein the generating the training feature according to the line segment edge feature comprises: obtaining the training feature by normalizing the line segment edge feature.

8. The training method according to claim 1, wherein the classification model is a support vector machine model or a convolutional neural network model.

9. A non-transitory readable storage medium having a computer program stored thereon, where the computer program, when executed, implements the training method according to claim 1.

10. A training device for a trace detection model, comprising:
a computing device comprising at least one hardware processor; and
program instructions stored in memory and executable by the at least one computing device that, when executed, direct the at least one computing device to:
acquire a sample image and a sample tag of the sample image;
perform line segment detection on the sample image and acquire a line segment edge feature of the sample image by:
obtaining a target sample image by pre-processing the sample image;
determining a region of interest (ROI) in the target sample image;
obtaining a line segment detection result by performing the line segment detection on the ROI in the target sample image, wherein the line segment detection result comprises endpoint coordinates of each detected line segment;
generating a line segment detection image according to the line segment detection result; and
acquiring, according to the line segment detection image, a line segment edge feature of an edge point as the line segment edge feature of the sample image, wherein a line segment edge feature of each edge point comprises coordinates of the edge point and a slope of a line segment to which the edge point belongs;
generate a training feature according to the line segment edge feature; and
obtain the trace detection model by training, according to the sample tag, the training feature, and a classification model;
wherein the generating the line segment detection image according to the line segment detection result comprises:
determining a length of each line segment detected in the target sample image according to the line segment detection result;
screening out a line segment whose length is within a length threshold range as a reference line segment, and using endpoint coordinates of the reference line segment as reference endpoint coordinates; and
generating the line segment detection image according to the reference endpoint coordinates of the reference line segment.

11. The training device according to claim 10, wherein the obtaining the target sample image by pre-processing the sample image comprises:
acquiring a standard image;
performing registration on the sample image according to the standard image; and
obtaining the target sample image by down-sampling the sample image subjected to the registration.

12. The training device according to claim 10, wherein the determining the ROI in the target sample image comprises:
acquiring a ROI parameter, wherein the ROI parameter comprises position information of the ROI; and
determining the ROI in the target sample image according to the ROI parameter.

13. The training device according to claim 10, wherein the generating the line segment detection image according to the reference endpoint coordinates of the reference line segment comprises:
obtaining one or more target line segments by generating, according to the reference endpoint coordinates of the reference line segment, a line connecting two endpoints of each reference line segment; and
obtaining the line segment detection image comprising one or more target line segments by setting pixel values for each target line segment, wherein the pixel values of the same target line segment are same, wherein in response to that the line segment detection image comprises multiple target line segments, different target line segments have different pixel values.

14. A computer-implemented trace detection method, comprising:
acquiring an image to be detected;
performing line segment detection on the image to be detected by:
obtaining a target image to be detected by pre-processing the image to be detected;
determining a region of interest (ROI) in the target image to be detected;
obtaining a line segment detection result of the image to be detected by performing the line segment detection on the ROI of the target image to be detected, wherein the line segment detection result comprises endpoint coordinates of each detected line segment;
generating a line segment detection image according to each line segment detection result; and
acquiring, according to the line segment detection image, a line segment edge feature of an edge point as the line segment edge feature of the image to be detected, wherein a line segment edge feature of each edge point comprises coordinates of the edge point and a slope of a line segment to which the edge point belongs;
acquiring a line segment edge feature of the image to be detected; and
obtaining a detection result by inputting the line segment edge feature into a trace detection model, and determining whether the image to be detected is standardized according to the detection result;
wherein the generating the line segment detection image according to the line segment detection result comprises:
determining a length of each line segment detected in the target sample image according to the line segment detection result;
screening out a line segment whose length is within a length threshold range as a reference line segment, and using endpoint coordinates of the reference line segment as reference endpoint coordinates; and
generating the line segment detection image according to the reference endpoint coordinates of the reference line segment.

15. A trace detection device, comprising:
an image capturing device configured to: acquire an image to be detected;
a memory configured to store executable instructions; and
at least one hardware processor coupled to the image capturing device and the memory, wherein the at least one hardware processor is directed to acquire the image to be detected and the executable instructions, and execute the trace detection method according to claim 14 by executing the executable instructions.

* * * * *